US00RE44992E

(19) United States
(12) Reissued Patent
Fenster

(10) Patent Number: US RE44,992 E
(45) Date of Reissued Patent: Jul. 8, 2014

(54) EXERCISE APPARATUS

(75) Inventor: Mrako A. Fenster, Madison, WI (US)

(73) Assignee: Johnson Health Tech Co., Ltd., Taichung (TW)

(21) Appl. No.: 29/398,219

(22) Filed: Jul. 28, 2011

Related U.S. Patent Documents

Reissue of:
(64) Patent No.: Des. 613,350
Issued: Apr. 6, 2010
Appl. No.: 29/342,347
Filed: Aug. 24, 2009

U.S. Applications:
(63) Continuation-in-part of application No. 29/314,057, filed on Mar. 3, 2009, now Pat. No. Des. 612,437.

(51) LOC (10) Cl. ..... 21-02
(52) U.S. Cl.
USPC ..... D21/675
(58) Field of Classification Search
USPC ..... D21/662, 670, 671, 672, 673, 674, 675, D21/676, 677, 686, 688, 689, 690, 691, 694, D21/697; 482/51, 52, 57, 58, 59, 61–65, 70, 482/97, 99, 100
See application file for complete search history.

(56) References Cited

U.S. PATENT DOCUMENTS

| | | | | |
|---|---|---|---|---|
| 5,643,152 | A * | 7/1997 | Simonson | 482/100 |
| 5,667,464 | A * | 9/1997 | Simonson | 482/97 |
| 6,071,216 | A * | 6/2000 | Giannelli et al. | 482/100 |
| 6,142,917 | A * | 11/2000 | Giannelli et al. | 482/100 |
| 6,152,864 | A * | 11/2000 | Giannelli et al. | 482/100 |
| 6,254,516 | B1 * | 7/2001 | Giannelli et al. | 482/100 |
| 6,409,637 | B1 * | 6/2002 | Webber et al. | 482/99 |
| D491,238 | S * | 6/2004 | Giannelli et al. | D21/676 |
| D493,454 | S * | 7/2004 | Andre et al. | D14/336 |
| D493,854 | S * | 8/2004 | Grider | D21/694 |

(Continued)

*Primary Examiner* — Phillip S Hyder

(57) CLAIM

The ornamental design for a exercise apparatus, as shown and described.

DESCRIPTION

[FIG. 1 is a perspective view of the exercise apparatus;]
[FIG. 2 is a front elevational view of the exercise apparatus;]
[FIG. 3 is a rear elevational view of the exercise apparatus;]
[FIG. 4 is a left side elevational view of the exercise apparatus;]
[FIG. 5 is a right side elevational view of the exercise apparatus; and,]
[FIG. 6 is a top plan view of the exercise apparatus.]
*FIG. 7 is a perspective view of the exercise apparatus;*
*FIG. 8 is a front elevational view of the exercise apparatus;*
*FIG. 9 is a rear elevational view of the exercise apparatus;*
*FIG. 10 is a left side elevational view of the exercise apparatus;*
*FIG. 11 is a right side elevational view of the exercise apparatus; and,*
*FIG. 12 is a top plan view of the exercise apparatus.*
The broken lines in the drawings depict unclaimed environmental subject matter.

1 Claim, 12 Drawing Sheets

Figure 1:
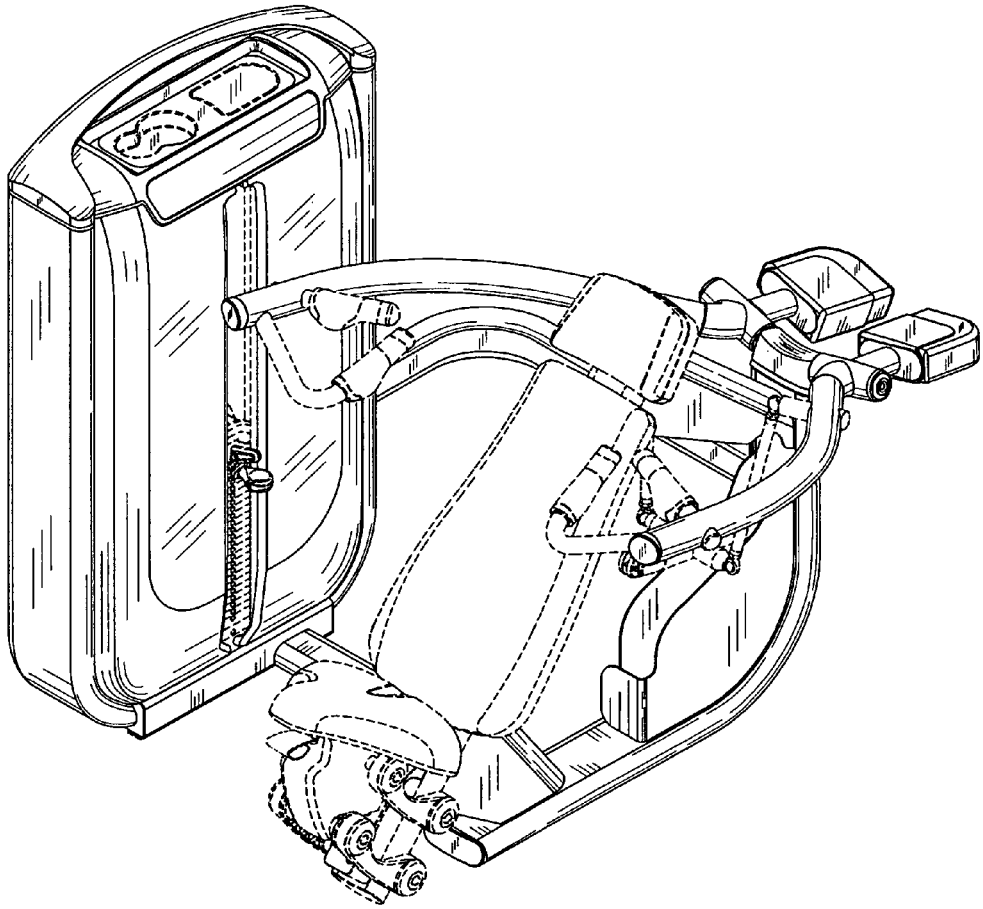
Figure 2:
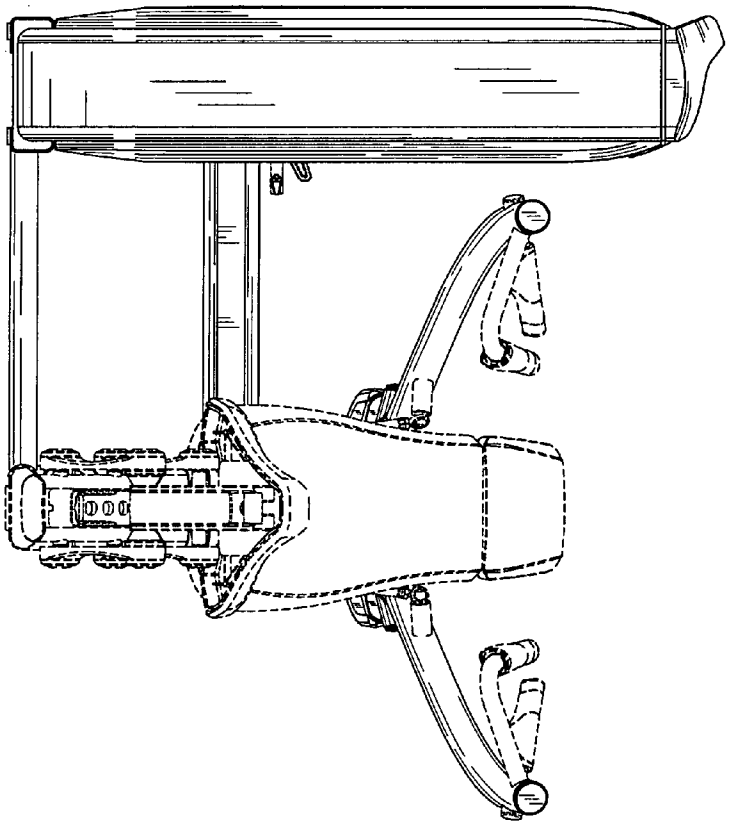
Figure 3:
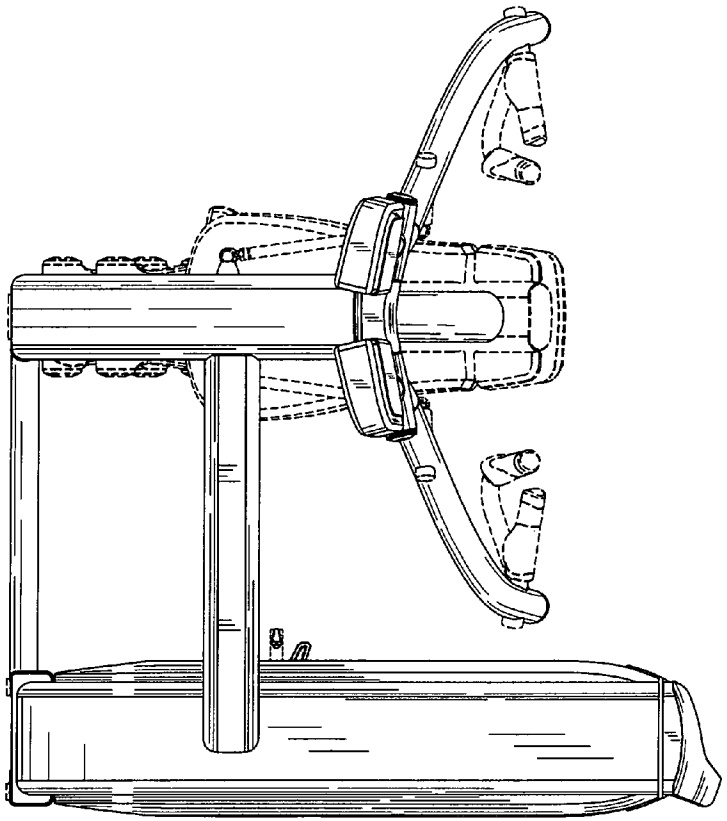
Figure 4:
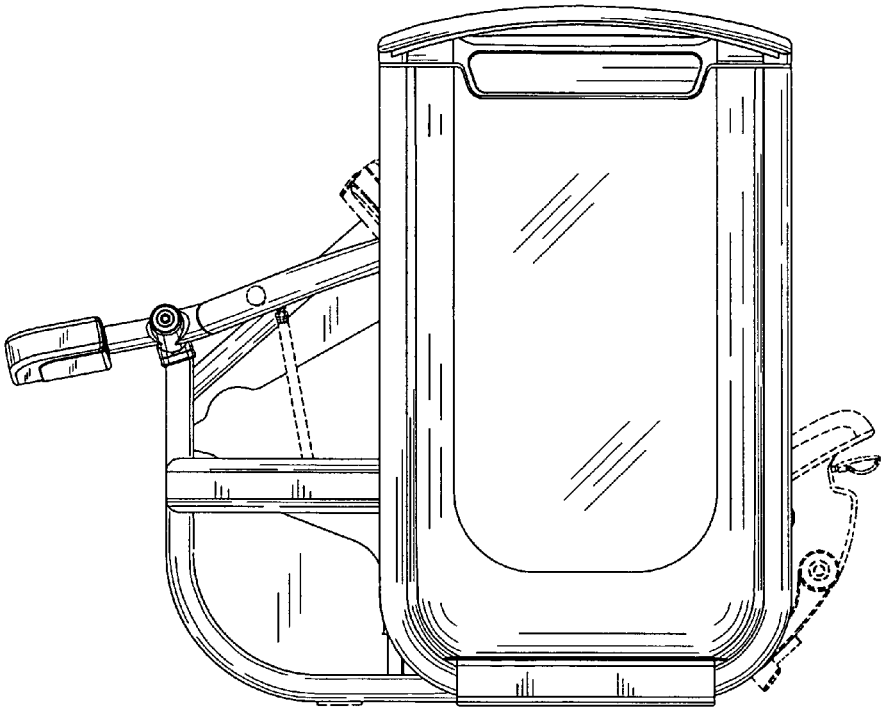
Figure 5:
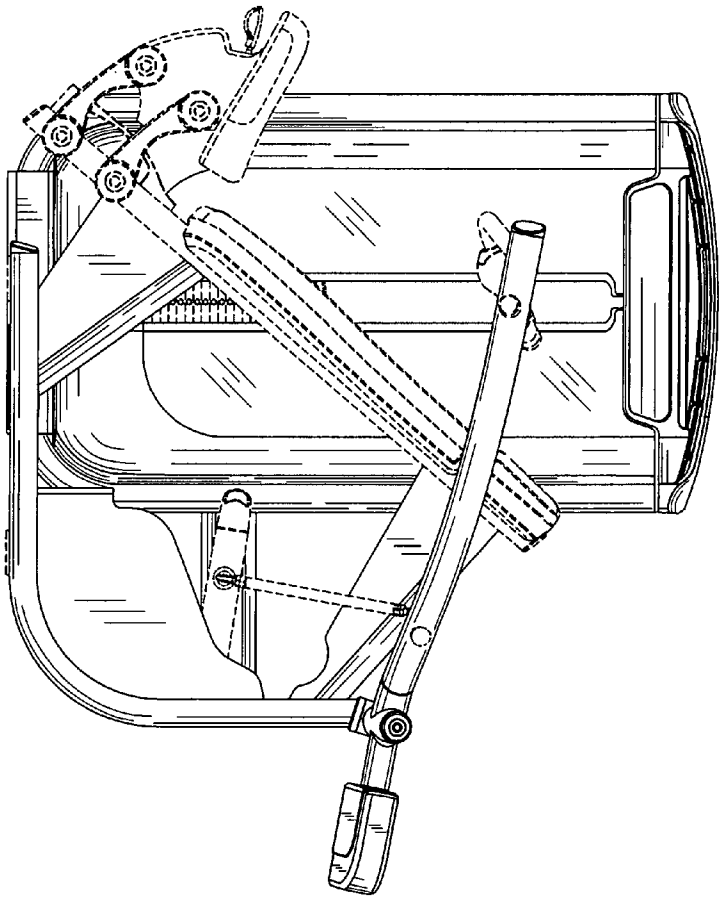
Figure 6:
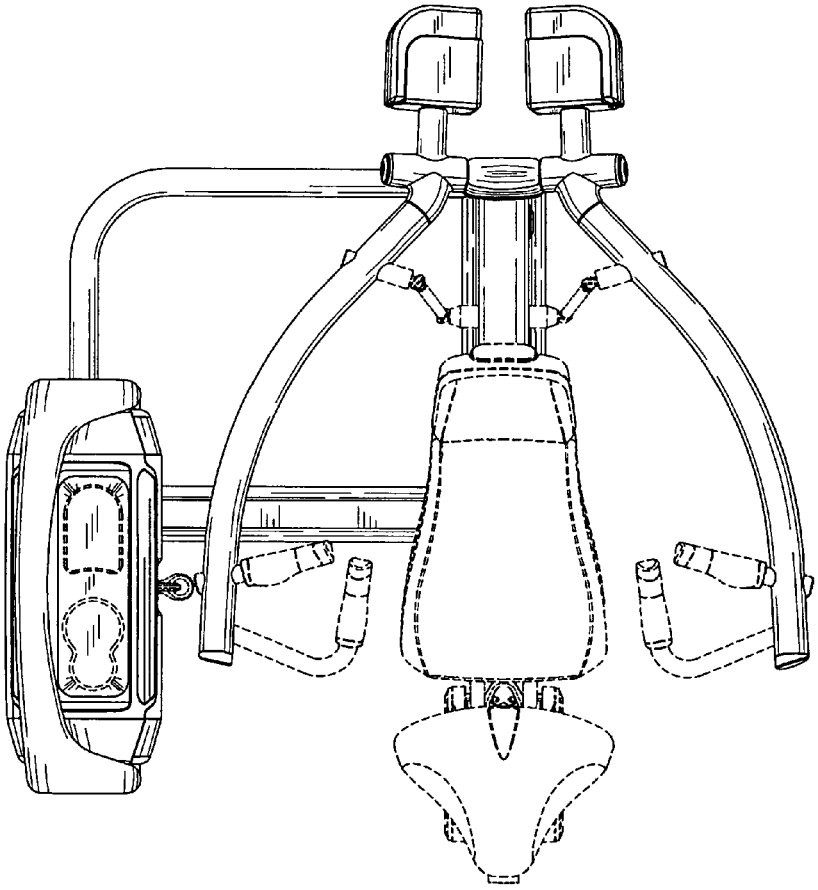

Matter enclosed in heavy brackets [ ] appears in the original patent but forms no part of this reissue; matter printed in italics indicates the additions made by reissue.

(NEW)

(56) References Cited

U.S. PATENT DOCUMENTS

D516,144 S * 2/2006 Panatta ..... D21/676
D574,449 S * 8/2008 Webber et al. ..... D21/675
2003/0092543 A1 * 5/2003 Giannelli ..... 482/100
2004/0005967 A1 * 1/2004 Panatta ..... 482/100

* cited by examiner

Fig. 1 (CANCELLED)

Fig. 2 (CANCELLED)

Fig. 3 (CANCELLED)

Fig. 4 (CANCELLED)

Fig. 5 (CANCELLED)

Fig. 6 (CANCELLED)

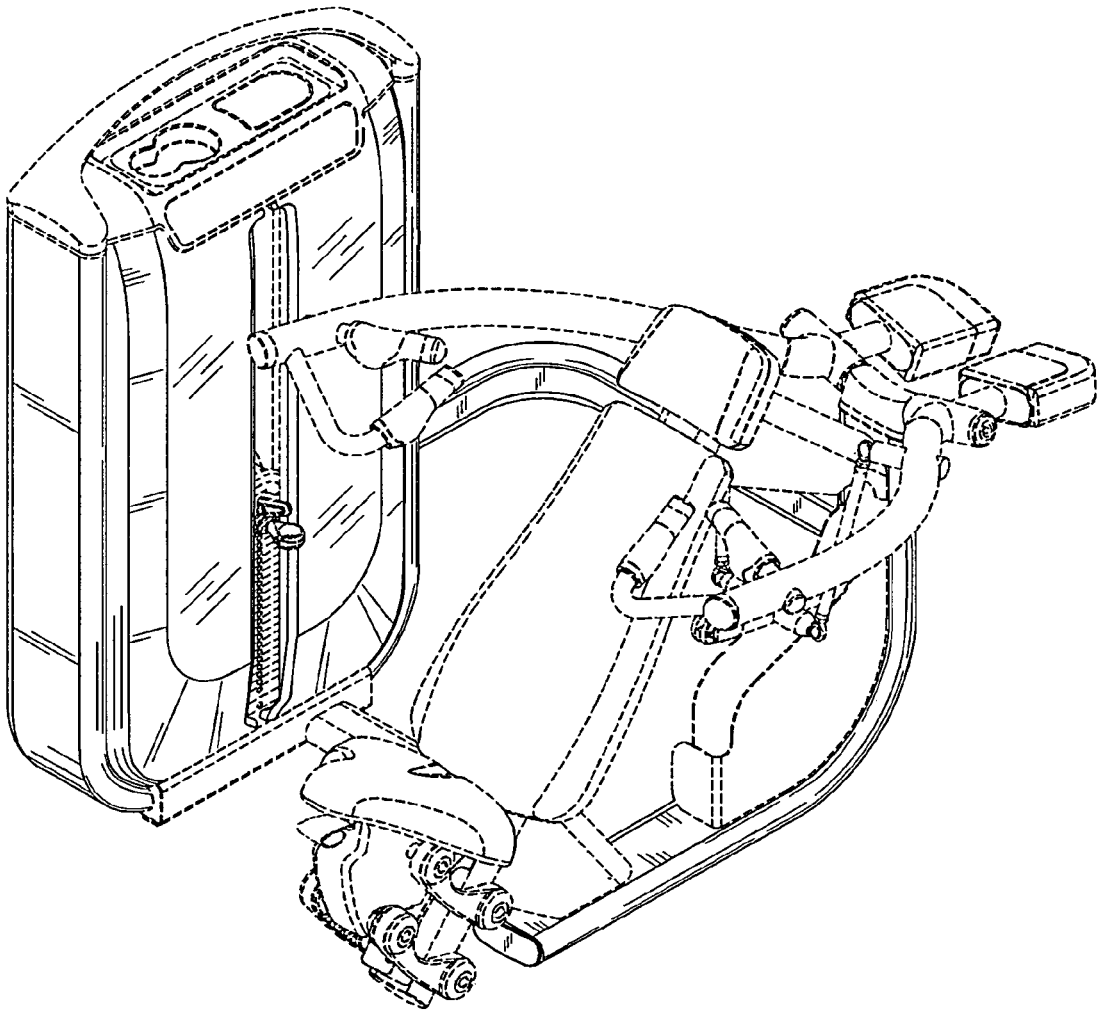
Fig. 7 (NEW)

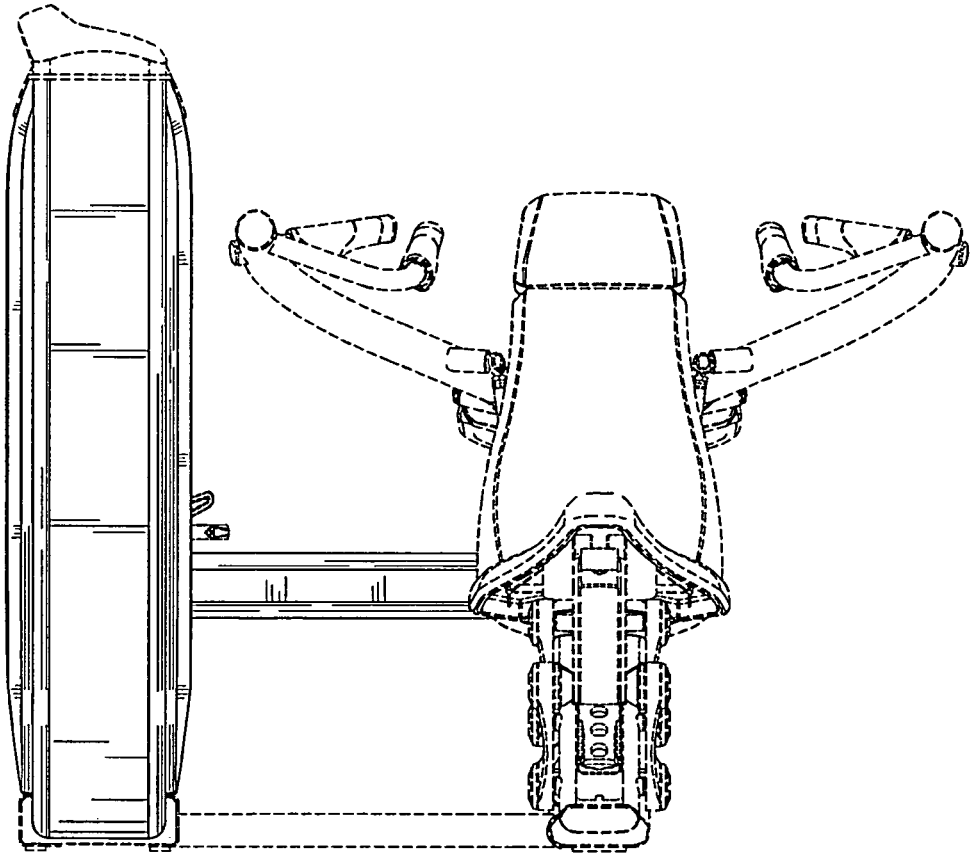
Fig. 8 (NEW)

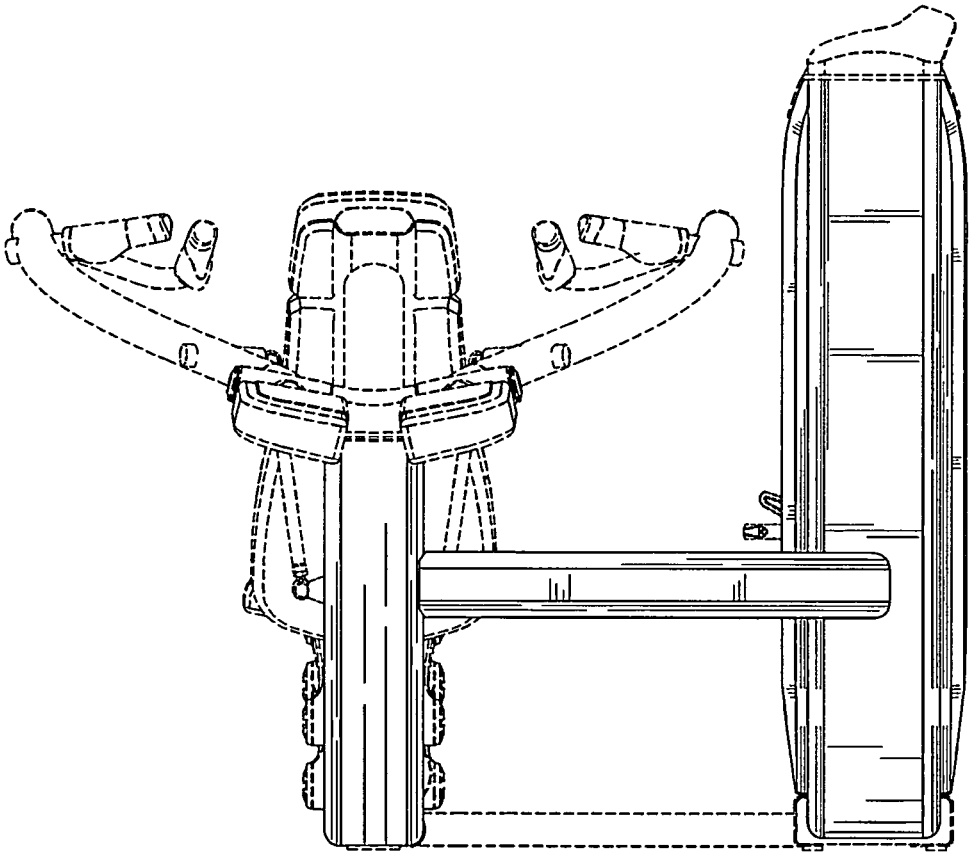
Fig. 9 (NEW)

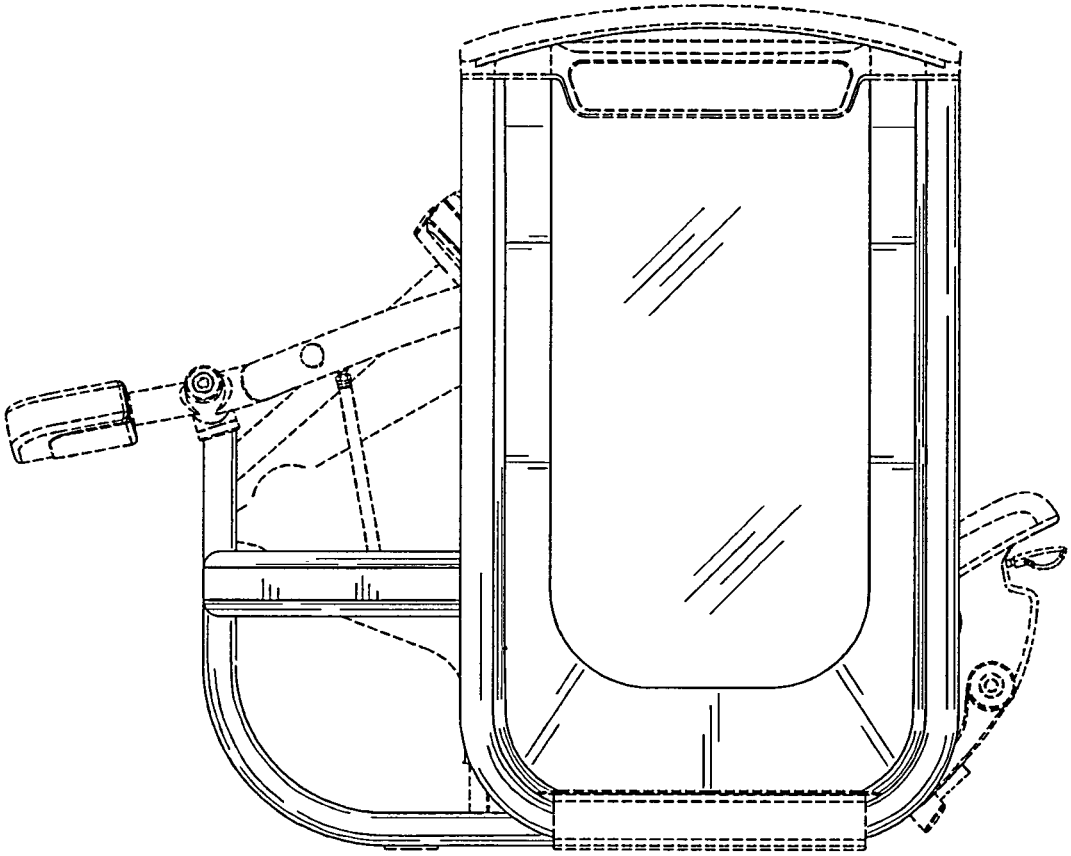
Fig. 10 (NEW)

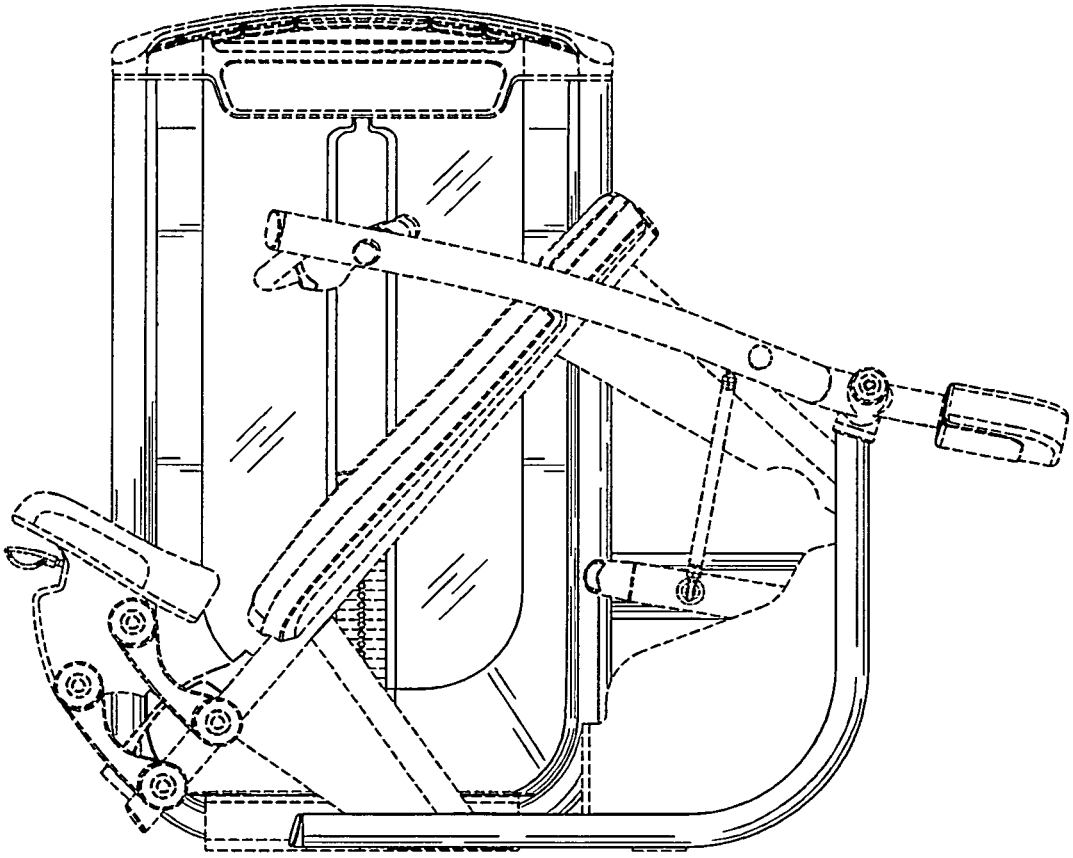
Fig. 11 (NEW)

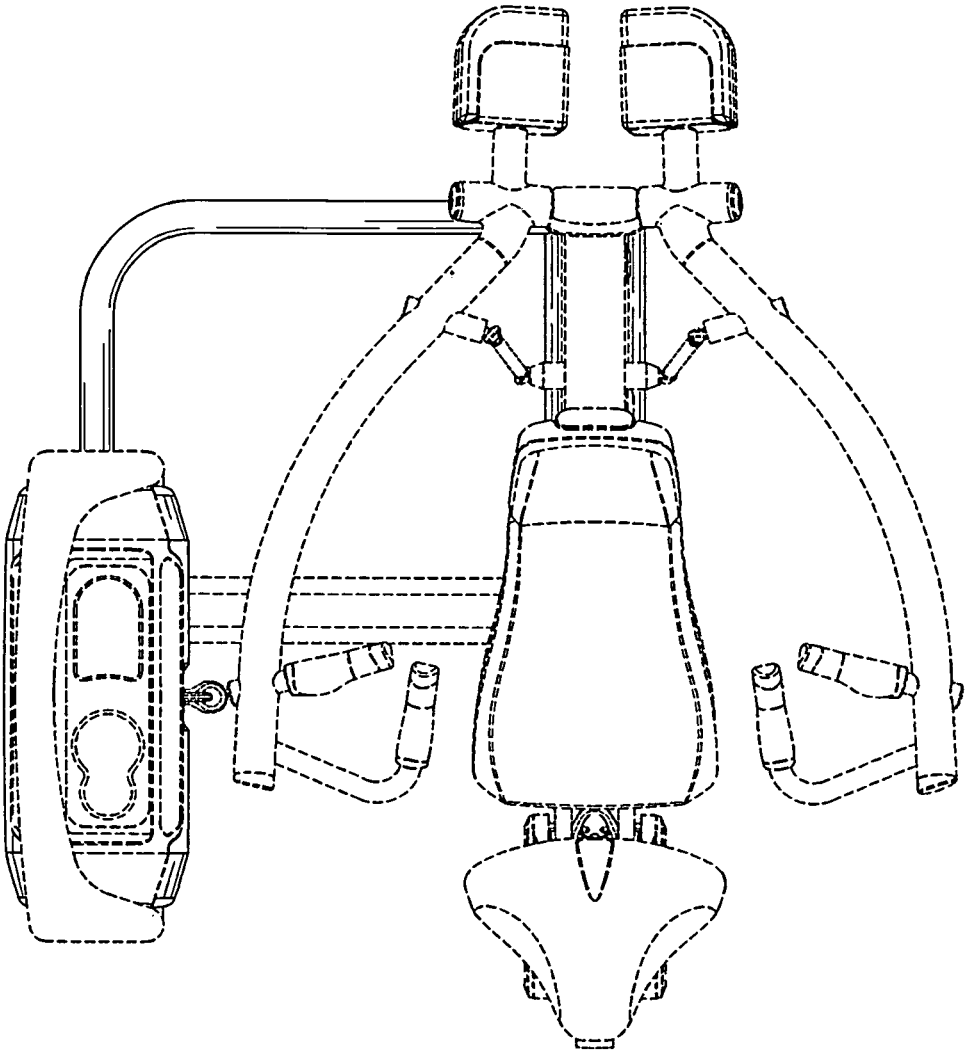
Fig. 12 (NEW)